US010010806B2

(12) United States Patent
Lee

(10) Patent No.: US 10,010,806 B2
(45) Date of Patent: Jul. 3, 2018

(54) APPARATUS FOR CONTROLLING LIGHTING BEHAVIOR OF A PLURALITY OF LIGHTING ELEMENTS AND A METHOD THEREFOR

(71) Applicant: Creative Technology Ltd, Singapore (SG)

(72) Inventor: Yee Shian Lee, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 15/584,976

(22) Filed: May 2, 2017

(65) Prior Publication Data

US 2017/0340984 A1 Nov. 30, 2017

(30) Foreign Application Priority Data

May 24, 2016 (SG) .......................... 10201604137Q
Aug. 11, 2016 (SG) .......................... 10201606668T

(51) Int. Cl.
| | | |
|---|---|---|
| *A63J 17/00* | (2006.01) | |
| *G11B 27/028* | (2006.01) | |
| *G11B 27/34* | (2006.01) | |
| *H05B 33/08* | (2006.01) | |
| *H05B 37/02* | (2006.01) | |

(52) U.S. Cl.
CPC .............. *A63J 17/00* (2013.01); *G11B 27/028* (2013.01); *G11B 27/34* (2013.01); *H05B 33/0863* (2013.01); *H05B 37/029* (2013.01); *G10H 2240/075* (2013.01)

(58) Field of Classification Search
CPC ................................ A63J 17/00; G11B 27/028
USPC ........................................................ 84/464 R
See application file for complete search history.

(56) References Cited

U.S. PATENT DOCUMENTS

| | | | | |
|---|---|---|---|---|
| 4,386,550 A | * | 6/1983 | Newsome ................ | A63J 17/00 84/464 R |
| 4,563,933 A | * | 1/1986 | Kim ........................ | G10D 3/00 84/267 |
| 5,056,399 A | * | 10/1991 | Hornstein ................ | A63J 17/00 340/815.45 |

(Continued)

OTHER PUBLICATIONS

Anonymous, Pulse Wireless Portable Speaker with LED Light Show, JBL by HARMAN International Industries, Incorporated, 2013, Accessed from: http://demandware.edgesuite.net/aauj_prd/on/demandware.static/-/Sites-masterCatalog_Harman/default/dw007d289b/pdfs/Specification%20Sheet%20Pulse%20(English).pdf.

(Continued)

*Primary Examiner* — David Warren
*Assistant Examiner* — Christina Schreiber
(74) *Attorney, Agent, or Firm* — Russell Swerdon; Desmund Gean

(57) ABSTRACT

There is provided an apparatus configured to control a plurality of light emitting elements so that the light emitting elements display a lighting behavior based on audio output which is based on an audio file. The apparatus can include a control portion and a choreography portion. The control portion is operable to generate an instruction sequence which can be used to control the lighting behavior of the light emitting elements, the instruction sequence can include a plurality of lighting instructions. The choreography portion is operable to associate at least one lighting instruction from the plurality of lighting instructions with at least one portion of the audio file.

5 Claims, 7 Drawing Sheets

(56) References Cited

U.S. PATENT DOCUMENTS

| | | | | |
|---|---|---|---|---|
| 5,461,188 | A * | 10/1995 | Drago | A43B 3/00 36/137 |
| 5,501,131 | A * | 3/1996 | Hata | H05B 37/0236 84/464 R |
| 6,008,783 | A * | 12/1999 | Kitagawa | A63J 17/00 345/39 |
| 6,166,496 | A * | 12/2000 | Lys | H05B 33/0857 315/292 |
| 6,342,663 | B1 * | 1/2002 | Kato | G09B 15/023 84/464 A |
| 6,585,554 | B1 * | 7/2003 | Hewitt | G10H 1/0008 434/408 |
| 6,927,331 | B2 * | 8/2005 | Haase | G10H 1/0008 84/461 |
| 7,169,995 | B2 * | 1/2007 | Lin | A63J 17/00 84/464 R |
| 7,227,075 | B2 * | 6/2007 | Chang | G10H 1/0008 340/815.46 |
| 7,228,190 | B2 * | 6/2007 | Dowling | A63J 17/00 340/815.46 |
| 7,342,164 | B2 * | 3/2008 | Nishibori | G10H 1/0016 84/464 R |
| 7,473,837 | B2 * | 1/2009 | Cui | A63J 17/00 84/464 R |
| 7,501,571 | B2 * | 3/2009 | Forsman | G10H 1/0016 84/464 R |
| 7,754,960 | B2 * | 7/2010 | Yamamoto | A63J 17/00 84/464 R |
| 8,269,646 | B2 * | 9/2012 | Exman | G09F 27/00 340/815.45 |
| 8,697,977 | B1 * | 4/2014 | Lysaght | G10H 1/0016 84/464 A |
| 8,901,405 | B1 * | 12/2014 | McCarthy | G09B 15/003 84/423 R |
| 9,439,272 | B2 * | 9/2016 | Moore | H05B 37/029 |
| 9,652,994 | B1 * | 5/2017 | Feng | G09B 15/00 |
| 9,655,218 | B1 * | 5/2017 | DePhillips | H05B 37/0272 |
| 9,681,523 | B2 * | 6/2017 | Wang | H05B 37/0272 |
| 2005/0217457 | A1 * | 10/2005 | Yamamoto | A63J 17/00 84/464 R |
| 2006/0117937 | A1 * | 6/2006 | Lawliss | G04F 5/025 84/636 |
| 2006/0137510 | A1 * | 6/2006 | Cui | A63J 17/00 84/464 R |
| 2007/0008711 | A1 * | 1/2007 | Kim | A63J 17/00 362/86 |
| 2009/0120267 | A1 * | 5/2009 | Baggs | G09B 15/00 84/464 R |
| 2010/0244738 | A1 * | 9/2010 | Aiso | H05B 33/0863 315/297 |
| 2010/0302799 | A1 * | 12/2010 | Rosberg | G02B 6/0041 362/602 |
| 2013/0098224 | A1 * | 4/2013 | Takasaki | A63J 17/00 84/464 R |
| 2014/0184386 | A1 * | 7/2014 | Regler | G08B 5/228 340/7.61 |
| 2016/0192308 | A1 * | 6/2016 | Turney | H04W 56/0015 370/350 |
| 2017/0135543 | A1 * | 5/2017 | Halloran | A47L 11/4011 |
| 2017/0196513 | A1 * | 7/2017 | Longinotti-Buitoni | A61B 5/6804 |
| 2017/0330429 | A1 * | 11/2017 | Tak | G08B 5/36 |
| 2017/0340983 | A1 * | 11/2017 | Tan | A63J 17/00 |
| 2017/0340984 | A1 * | 11/2017 | Lee | G11B 27/34 |

OTHER PUBLICATIONS

Wheeler, David; Johnson, Daryl; Yuan, Bo; and Lutz, Peter, Audio Steganography Using High Frequency Noise Introduction, RIT Scholar Works, 2012, Accessed from http://scholarworks.rit.edu/other/302.

* cited by examiner

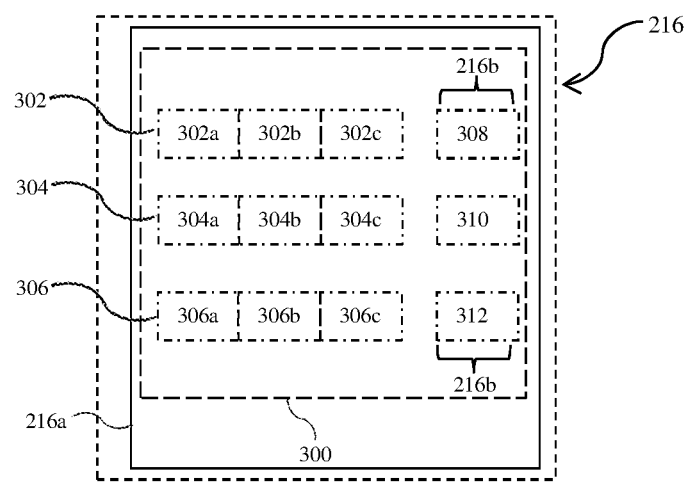
Fig.3d
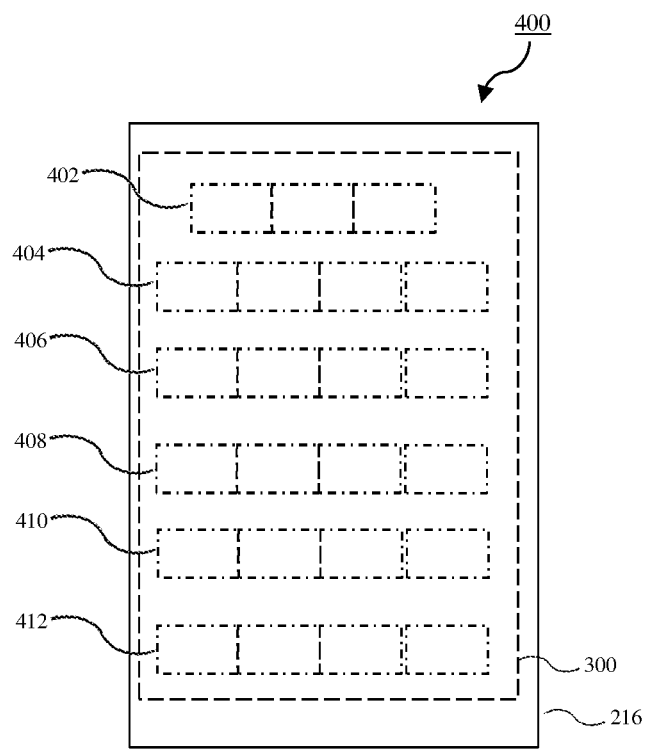
Fig.4a
| LED 1 | Assigned to Group 1 |
|---|---|
| LED 2 | Assigned to Group 1 |
| LED 3 | Assigned to Group 2 |
| LED 4 | Assigned to Group 2 |
| LED 5 | Assigned to Group 3 |
| LED 6 | Assigned to Group 3 |
| LED 7 | Assigned to Group 4 |
| LED 8 | Assigned to Group 4 |
| LED 9 | Assigned to Group 5 |
| LED 10 | Assigned to Group 5 |
| LED 11 | Assigned to Group 6 |
| LED 12 | Assigned to Group 6 |
| LED 13 | Assigned to Group 7 |
| LED 14 | Assigned to Group 7 |
Fig.4b

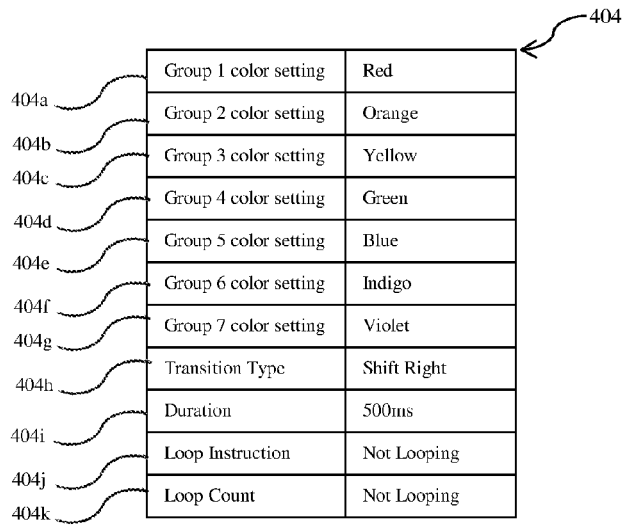
Fig.4c
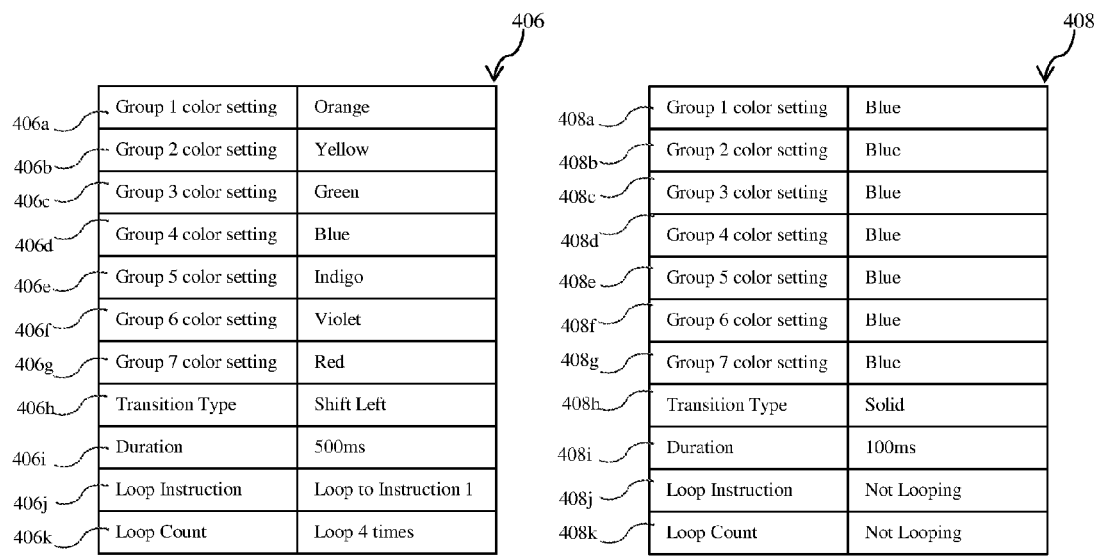
Fig.4d
Fig.4e

| | | |
|---|---|---|
| 410a | Group 1 color setting | Black |
| 410b | Group 2 color setting | Black |
| 410c | Group 3 color setting | Black |
| 410d | Group 4 color setting | Black |
| 410e | Group 5 color setting | Black |
| 410f | Group 6 color setting | Black |
| 410g | Group 7 color setting | Black |
| 410h | Transition Type | Solid |
| 410i | Duration | 100ms |
| 410j | Loop Instruction | Loop to Instruction 3 |
| 410k | Loop Count | Loop 4 times |

Fig.4f

| | | |
|---|---|---|
| 412a | Group 1 color setting | Black |
| 412b | Group 2 color setting | Black |
| 412c | Group 3 color setting | Black |
| 412d | Group 4 color setting | Black |
| 412e | Group 5 color setting | Black |
| 412f | Group 6 color setting | Black |
| 412g | Group 7 color setting | Black |
| 412h | Transition Type | Solid |
| 412i | Duration | Not Applicable |
| 412j | Loop Instruction | Loop to Instruction 1 |
| 412k | Loop Count | Loop 10 times |

Fig.4g

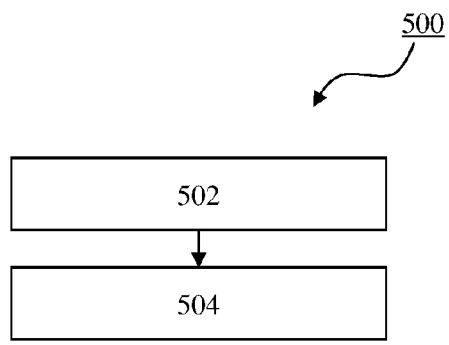

Fig.5

APPARATUS FOR CONTROLLING LIGHTING BEHAVIOR OF A PLURALITY OF LIGHTING ELEMENTS AND A METHOD THEREFOR

FIELD OF INVENTION

The present disclosure generally relates to an electronic device carrying a plurality of light emitting elements such as Light Emitting Diodes (LEDs) which can be configured to display a lighting behavior/pattern based on a sequence of instructions provided by a user. The present disclosure further relates to a method and an apparatus suitable for controlling lighting behavior of a plurality of light emitting elements.

BACKGROUND

It is fairly common for electronic gadgets for entertainment to include lightshows so as to enhance entertainment value.

For example, an electronic gadget such as a speaker device can carry light emitting diodes which can be preset to present lightshows while music is being played. Hence a listener can be afforded both audio enjoyment and visual enjoyment if desired.

However, lightshows are quite often preset and may not necessarily suit the preferences of the listener.

Moreover, even if some form of customization is provided, the extent of customization may also be limited such that the listener may not necessarily be able to customize lightshows to fully suit his/her preferences.

It is therefore desirable to provide a solution to address the foregoing problem.

SUMMARY OF THE INVENTION

In accordance with an aspect of the disclosure, there is provided an apparatus configured to control a plurality of light emitting elements so that the light emitting elements display a lighting behavior based on audio output. Audio output can be based on an audio file.

The apparatus can include a control portion and a choreography portion.

The control portion can be operated to generate an instruction sequence which can be used for controlling the lighting behavior of the light emitting elements. The instruction sequence can include a plurality of lighting instructions.

The choreography portion can be operated to associate at least one lighting instruction from the plurality of lighting instructions with at least one portion of the audio file. In one example, the choreography portion can be used for embedding at least one lighting instruction from the plurality of lighting instructions in the audio file so as to generate a modified audio file.

Preferably, the modified audio file can be saved for subsequent replay by one or both of the apparatus and another device.

BRIEF DESCRIPTION OF THE DRAWINGS

Embodiments of the disclosure are described hereinafter with reference to the following drawings, in which:

FIG. 3a to FIG. 3d show that the control portion mentioned in each of FIG. 1 and FIG. 2 can include a Graphics User Interface (GUI), according to an embodiment of the disclosure;

FIG. 4a to FIG. 4g show an exemplary scenario concerning user operation of the control portion mentioned in each of FIG. 1 and FIG. 2, according to an embodiment of the disclosure;

FIG. 5 shows a flow diagram of a method in relation to the system of FIG. 1 and electronic device of FIG. 2, according to an embodiment of the disclosure.

DETAILED DESCRIPTION

Representative embodiments of the disclosure, for addressing the foregoing problem(s), are described hereinafter with reference to FIG. 1 to FIG. 5.

Specifically, the present disclosure contemplates an electronic device such as a speaker, a soundbar etc. which carries a plurality of light emitting elements such as Light Emitting Diodes (LEDs). The light emitting elements can be configured to display a lighting behavior/pattern based on a sequence of instructions provided by a user. The sequence of instructions (i.e., instruction sequence) can be entered by the user using/operating a control portion which can be a part of the electronic device and/or not a part of the electronic device. The control portion can also be software based and/or hardware based. Preferably, the control portion allows the user to enter any number of lighting instructions to form a sequence of instructions so that the lighting behavior/pattern of the light emitting elements can be customized per user preference in a flexible manner.

Figure 1A:
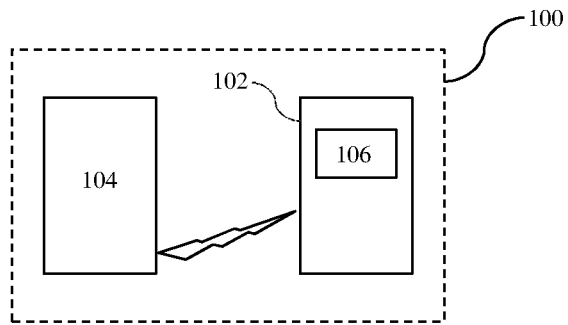
FIG. 1a shows a system which can include an electronic device and an apparatus, according to an embodiment of the disclosure.

FIG. 1a shows a system 100 in accordance with an embodiment of the disclosure. The system 100 can include an electronic device 102 such as a speaker or a soundbar. The system 100 can further include an apparatus 104 such as a computer (e.g., Smartphones, Tablets, Laptops, Desktops). The apparatus 104 can be coupled to the electronic device 102. Coupling between the electronic device 102 and the apparatus 104 can be via one or both of wired coupling and wireless coupling.

The electronic device 102 can be shaped and dimensioned to carry a plurality of light emitting elements 106 such as LEDs. As will be discussed later in further detail with reference to FIG. 1b, the light emitting elements 106 can be configured to display a lighting behavior/pattern based on a sequence of instructions provided by a user. The sequence of instructions can include a plurality of lighting instructions.

Operationally, as will be discussed later in further detail with reference to FIG. 1b, the apparatus 104 can be used/operated by a user to generate/enter the lighting instructions which can be communicated to the electronic device 102.

Figure 1B:
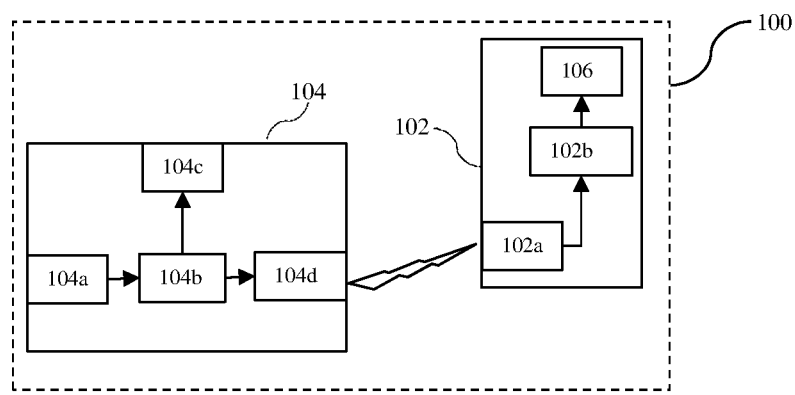
FIG. 1b shows the electronic device and the apparatus of FIG. 1a in further detail where the apparatus can include a control portion, according to an embodiment of the disclosure.

FIG. 1b shows the system 100 of FIG. 1a in further detail in accordance with an embodiment of the disclosure.

As shown, the apparatus 104 can include an input part 104a, a processing part 104b, a display part 104c and, optionally, a transceiver part 104d. The input part 104a can be coupled to the processing part 104b. The processing part 104b can be coupled to the display part 104c. Moreover, the processing part 104b can be coupled to the transceiver part 104d.

Where the apparatus 104 is, for example, a computer, the input part 104a can, for example, be a mouse/keyboard, the processing part 104b can, for example, be a microprocessor, the display part 104c can, for example, be a display screen and the transceiver part 104d can, for example, be a modem.

Operationally, a user can use the input part 104a to generate input signals which can be communicated to the processing part 104b for processing to generate control signals and output signals. The input signals can, for example, include lighting instructions generated/entered by the user. The control signals can be communicated to the transceiver part 104d and the transceiver part 104d can, in turn, communicate the control signals to the electronic device 102. The output signals can be communicated to the display part 104c for viewing by the user.

The display part 104c can be configured to display, for example, a graphics user interface (GUI) for viewing by the user. The GUI can be visually perceived by the user to be updated accordingly based on the output signals. Specifically, the GUI displayed by the display part 104c can be visually updated accordingly as a user enters/generates lighting instructions (i.e., input signals) using the input part 104a.

Earlier mentioned, the control signals can be communicated to the transceiver part 104d and the transceiver part 104d can, in turn, communicate the control signals to the electronic device 102. The control signals can be received by the electronic device 102 for controlling the lighting behavior/pattern of the light emitting elements 106 as will be discussed in further detail hereinafter.

The electronic device 102 can, for example, include a transceiver module 102a and a driver module 102b. The transceiver module 102a can be coupled to the driver module 102b. The driver module 102b can be coupled to the light emitting elements 106.

Control signals communicated from the apparatus 104 can be received by the transceiver module 102a which can in turn communicate the received control signals to the driver module 102b. The driver module 102b can be configured to process the received control signals to produce driver signals for driving the light emitting elements 106.

In this regard, it is appreciable that lighting behavior/pattern of the light emitting elements 106 is based on the sequence of instructions (i.e., instruction sequence) generated/entered by a user operating the apparatus 104.

It is further appreciable at least the input part 104a and the GUI displayed via the display part 104c can constitute a control portion which can be operated/used by a user to generate an instruction sequence which controls the lighting behavior/pattern of the light emitting elements 106. Therefore, the control portion can be considered to be both software and hardware based. Moreover, it can be appreciated that, by virtue of at least the input part 104a and the GUI displayed via the display part 104c, the apparatus 104 can be considered to include a control portion.

It is yet further appreciable that the control portion is capable of allowing a user to enter/generate any number of lighting instructions (i.e., input signals) to form an instruction sequence (i.e., control signals) so that the lighting behavior/pattern of the light emitting elements 106 can be customized per user preference in a flexible manner as will be discussed later in further detail with reference to FIG. 2 and FIG. 3.

Figure 2:
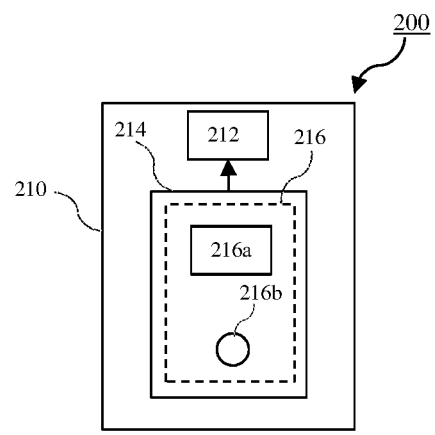
FIG. 2 shows an electronic device 200 which can include a control portion analogous to the control portion of the apparatus of FIG. 1b, according to an embodiment of the disclosure.

FIG. 2 shows an electronic device 200 in accordance with an embodiment of the disclosure. The electronic device 200 can, for example, be an audio output based device such as a speaker or a soundbar.

The electronic device 200 can include a casing 210 shaped and dimensioned to carry a one or more speaker drivers (not shown), a plurality of light emitting elements 212 and an apparatus 214. The light emitting elements 212 can be coupled to the apparatus 214.

The light emitting elements 212 can be configured to display a lighting behavior/pattern based on a sequence of instructions provided by a user. In this regard, the user can be able to enjoy a flexibly customized light show (i.e., visual perception of lighting behavior/pattern from the light emitting elements 212) while enjoying audio output from the speaker drivers. In one exemplary application, as will be discussed in further detail with reference to FIG. 6, a user can choreograph lighting behavior/pattern based on audio output.

The sequence of instructions can include a plurality of lighting instructions which can be entered/generated by a user using/operating the apparatus 214.

The apparatus 214 can include a control portion 216 which can include a display screen 216a and an option portion 216b. Moreover, the apparatus 214 of FIG. 2 can be analogous to the apparatus 104 of FIG. 1. In this regard, relevant portions of the earlier discussion concerning the apparatus 104 of FIG. 1 can analogously apply to the apparatus 214 of FIG. 2. For example, the apparatus 214 of FIG. 2 can further include an input part and a processing part per the apparatus 104 of FIG. 1. Moreover, the electronic device 200 can further include a driver module (not shown) analogous to the driver module 102b as discussed with reference to FIG. 1. Appreciably, for the electronic device 200, the driver module can be coupled to the light emitting elements 212 and communicate driver signals (based on control signals) for driving the light emitting elements 212.

Operationally, the control portion 216 can be operated to generate an instruction sequence (i.e., a sequence of instructions) which controls the lighting behavior of the light emitting elements 212. The control portion 216 can be analogous to the control portion earlier mentioned in FIG. 1.

Considering FIG. 1 and FIG. 2, it is appreciable that the electronic device 200 and the system 100 differ in that the control portion discussed per FIG. 1 is outside of the electronic device 102 (i.e., the apparatus 104 per the system 100 is not a part of, but coupled to, the electronic device 102 per se) whereas the control portion 216 discussed per FIG. 2 is a part of the electronic device 200. However, as mentioned earlier, the control portion per FIG. 1 can be analogous (functionally, operationally and/or structurally etc.) to the control portion 216 per FIG. 2. Hence it is understood that further discussion(s)/reference(s) to the control portion 216 hereinafter can similarly apply to the control portion per FIG. 1.

Additionally, as with the control portion mentioned in FIG. 1, the control portion 216 is capable of allowing a user to enter/generate any number of lighting instructions (i.e., input signals) to form an instruction sequence (i.e., control signals) so that the lighting behavior/pattern of the light emitting elements can be customized per user preference in a flexible manner as will be discussed in further detail with reference to FIG. 3 hereinafter.

Referring to FIG. 3a to FIG. 3d, the control portion 216 (and, analogously, the control portion per FIG. 1) can include a Graphics User Interface (GUI) 300, in accordance with an embodiment of the disclosure.

Figure 3A:
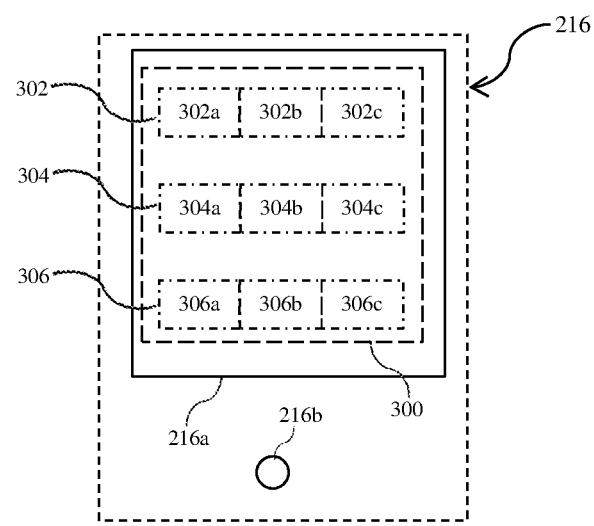

In one embodiment, as shown in FIG. 3a, the display screen 216a (i.e., a display part) can be configured to display the aforementioned GUI 300 for the purpose of allowing a user to enter/generate the lighting instructions, and the option portion 216b can be hardware based in that the option portion 216b can be in the form of a push button. The GUI 300 can be configured to present one or more input portions. Specifically, the GUI 300 can have an initial appearance showing an input portion 302 (i.e., a first input portion 302) having one or more sub portions 302a/302b/302c for generating/entering a lighting instruction (i.e., a first lighting instruction). Where the user desires to generate/enter another lighting instruction (i.e., a second lighting instruction), the user can press the option portion 216b so that the GUI 300 can be visually updated in that another input portion 304 (i.e., a second input portion 304) having one or more sub portions 304a/304b/304c for generating/entering another lighting instruction can be displayed. Where the user desires to generate/enter yet another lighting instruction (i.e., a third lighting instruction), the user can press the option portion 216b so that the GUI can be further visually updated in that yet another input portion 306 (i.e., a third input portion 306) having one or more sub portions 306a/306b/306c for generating/entering yet another lighting instruction can be displayed. In this regard, based on user operation of the option portion 216b, the display screen 216a can, for example, be configured to display a GUI 300 sequentially presenting a first input portion 302, a second input portion 304 and a third input portion 306 (i.e., starting with the first input portion 302 being initially presented, presenting the second input portion 304 as the user operates the option portion 216b and ending with presenting the third input portion 306 as the user operates the option portion 216b again) which can, all at the same time (i.e., all three input portions 302/304/306), be visibly perceived by the user. The first to third input portions 302/304/306 can, functionally, be for the purpose of allowing a user to enter/generate a first lighting instruction to a third lighting instruction respectively.

Moreover, it is appreciable that when the user is entering/generating lighting instructions, a subsequent input portion is presented/displayed only after the user presses the option portion 216b.

For example, in regard to the initial appearance, the second and third input portions 304/306 are yet presented/displayed. The second input portion 304 is presented/displayed only after the user presses the option portion 216b and the third input portion 306 is presented/displayed only after the user presses the option portion 216b yet again. After the third input portion 306 is displayed/presented, it is appreciable that all three input portions 302/304/306 are presented/displayed and visually perceivable by the user.

Figure 3B:
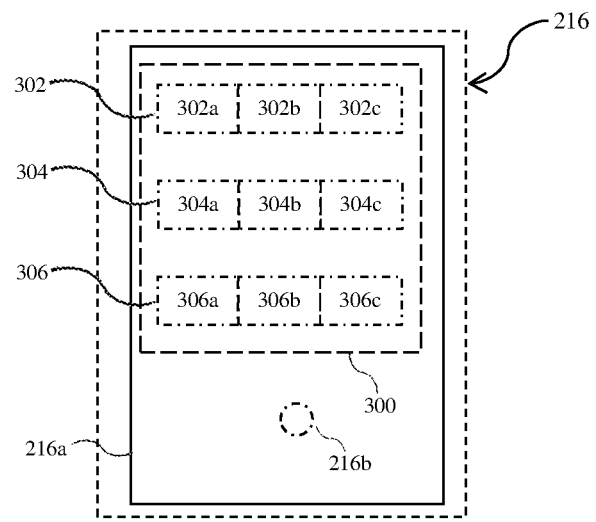

In another embodiment, as shown in FIG. 3b, the display screen 216a can be a touch screen based display screen configured to display the aforementioned GUI 300 and the option portion 216b. As mentioned earlier, the GUI 300 can, functionally, be for the purpose of allowing a user to enter/generate the lighting instructions. The GUI 300 can be configured to present one or more input portions. Specifically, the GUI 300 can have an initial appearance showing an input portion 302 (i.e., a first input portion 302) having one or more sub portions 302a/302b/302c for generating/entering a lighting instruction (i.e., a first lighting instruction). Where the user desires to generate/enter another lighting instruction (i.e., a second lighting instruction), the user can touch the display screen 216a where the option portion 216b is displayed so that the GUI 300 can be visually updated in that another input portion 304 (i.e., a second input portion 304) having one or more sub portions 304a/304b/304c for generating/entering another lighting instruction can be displayed. Where the user desires to generate/enter yet another lighting instruction, the user can touch the display screen 216a where the option portion 216b is displayed so that the GUI 300 can be further visually updated in that yet another input portion 306 (i.e., a third input portion) having one or more sub portions 306a/306b/306c for generating/entering yet another lighting instruction can be displayed. Therefore, the option portion 216b can be software based in that a user can touch the display screen 216a where the option portion 216b is visually perceived so as to generate/enter a new lighting instruction.

Moreover, based on user operation of the option portion 216b, the display screen 216a can, for example, be configured to display a GUI 300 sequentially presenting a first input portion 302, a second input portion 304 and a third input portion 306 (i.e., starting with the first input portion 302 being initially presented, presenting the second input portion 304 as the user operates the option portion 216b and ending with presenting the third input portion 306 as the user operates the option portion 216b again) which can, all at the same time (i.e., all three input portions 302/304/306), be visibly perceived by the user. The first to third input portions 302/304/306 can, functionally, be for the purpose of allowing a user to enter/generate a first lighting instruction to a third lighting instruction respectively. In this regard, relevant portions of the earlier discussion per FIG. 3a analogously apply.

Figure 3C:
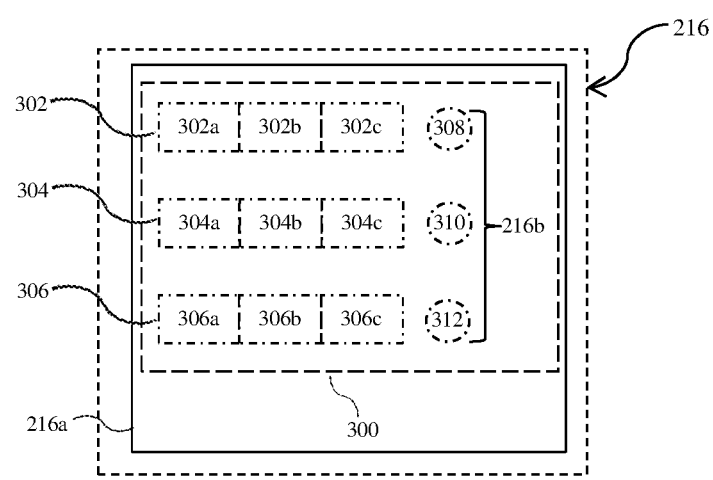

In yet another embodiment, as shown in FIG. 3c, the display screen 216a can be a touch screen based display screen configured to display the aforementioned GUI 300. The GUI 300 can be configured to present one or more input portions and one or more option portion(s) 216b. Earlier mentioned, the GUI 300 can, functionally, be for the purpose of allowing a user to enter/generate the lighting instructions. Depending on user usage/operation, a first option portion 308, a second option portion 310 and a third option portion 312 can, for example, be displayed. In a more specific example, the GUI 300 can have an initial appearance showing an input portion 302 (i.e., a first input portion 302) having one or more sub portions 302a/302b/302c for generating/entering a lighting instruction (i.e., a first lighting instruction) without displaying any of the first to third option portions 308/310/312. After a user has entered/generated a lighting instruction (i.e., the first lighting instruction) using the input portion 302, the GUI 300 can be visually updated so as to present the first option portion 308 (i.e., the second and third option portions 310/312 are not displayed yet). Where the user desires to enter another lighting instruction (i.e., a second lighting instruction), the user can touch the display screen 216a where the first option portion 308 is displayed so that the GUI 300 can be further visually updated in that another input portion 304 (i.e., a second input portion 304) having one or more sub portions 304a/304b/304c for generating/entering another lighting instruction can be displayed. After a user has entered/generated another lighting instruction (i.e., the second lighting instruction) using the most recently displayed input portion 304 (i.e., the second input portion 304), the GUI 300 can be visually updated so as to present the second option portion 310 (i.e., the third option portion 312 is not displayed yet). Where the user desires to enter yet another lighting instruction (i.e., a third lighting instruction), the user can touch the display screen 216a where the second option portion 310 is displayed so that the GUI 300 can be further visually updated in that yet another input portion 306 (i.e., a third input portion 306) having one or more sub portions 306a/306b/306c for generating/entering yet another lighting instruction can be displayed. After a user has entered/generated yet another lighting instruction (i.e., the third lighting instruction) using the most recently displayed input portion 306 (i.e., the third input portion 306), the GUI 300 can be visually updated so as to present the third option portion 312 (i.e., the first to third option portions 308/310/312 are all displayed). In this regard, it is appreciable that the GUI 300 can be generally updated in that an option portion is displayed only after a user has generated/entered a lighting instruction (e.g., the first option portion 308 is only displayed after a user has generated/entered the first lighting instruction and the second option portion 310 is only displayed after a user has generated/entered the second lighting instruction).

Moreover, based on user operation of the option portion 216b, the display screen 216a can, for example, be configured to display a GUI 300 sequentially presenting a first input portion 302, a second input portion 304 and a third input portion 306 (i.e., starting with the first input portion 302 being initially presented, presenting the second input portion 304 as the user operates the option portion 216b and ending with presenting the third input portion 306 as the user operates the option portion 216b again) which can, all at the same time (i.e., all three input portions 302/304/306), be visibly perceived by the user. The first to third input portions 302/304/306 can, functionally, be for the purpose of allowing a user to enter/generate a first lighting instruction to a third lighting instruction respectively. In this regard, relevant portions of the earlier discussion per FIG. 3a/FIG. 3b analogously apply.

In yet a further embodiment, as shown in FIG. 3d, the display screen 216a can be a touch screen based display screen configured to display the aforementioned GUI 300. The GUI 300 can be configured to present one or more input portions and one or more option portion(s) 216b. Earlier mentioned, the GUI 300 can, functionally, be for the purpose for the purpose of allowing a user to enter/generate the lighting instructions. Depending on user usage/operation, a first option portion 308, a second option portion 310 and a third option portion 312 can, for example, be sequentially displayed/presented. In a more specific example, the GUI 300 can have an initial appearance showing the first option portion 308 (i.e., the second and third option portions 310/312 are not yet displayed) and an input portion 302 (i.e., a first input portion 302) having one or more sub portions 302a/302b/302c for generating/entering a lighting instruction (i.e., a first lighting instruction). Where the user desires to enter another lighting instruction (i.e., a second lighting instruction), the user can touch the display screen 216a where the first option portion 308 is displayed so that the GUI 300 can be visually updated in that another input portion 304 (i.e., a second input portion 304) having one or more sub portions 304a/304b/304c for generating/entering another lighting instruction and the second option portion 310 can be presented (i.e., the third option portion 312 is not yet presented). Where the user desires to enter yet another lighting instruction (i.e., a third lighting instruction), the user can touch the display screen 216a where the second option portion 310 is displayed so that the GUI 300 can be further visually updated in that yet another input portion 306 (i.e., a third input portion 306) having one or more sub portions 306a/306b/306c for generating/entering yet another lighting instruction and the third option portion 312 can be presented. In this regard, it is appreciable that the GUI 300 can be generally updated in that a new input portion and a new option portion are presented each time a user makes contact with an option portion on the display screen 216a (e.g., the second input portion 304 and the second option portion 310 are displayed/presented at the same time by the display screen 216a after a user makes contact with the first option portion 308 displayed by the display screen 216a).

Moreover, based on user operation of the option portion 216b, the display screen 216a can, for example, be configured to display a GUI 300 sequentially presenting a first input portion 302, a second input portion 304 and a third input portion 306 (i.e., starting with the first input portion 302 being initially presented, presenting the second input portion 304 as the user operates the option portion 216b and ending with presenting the third input portion 306 as the user operates the option portion 216b again) which can, all at the same time (i.e., all three input portions 302/304/306), be visibly perceived by the user. The first to third input portions 302/304/306 can, functionally, be for the purpose of allowing a user to enter/generate a first lighting instruction to a third lighting instruction respectively. In this regard, relevant portions of the earlier discussion per FIG. 3a/FIG. 3b/FIG. 3c analogously apply.

Appreciably, since an input portion can include a plurality of sub portions (e.g., the first input portion 302 can include sub portions 302a/302b/302c) for generating/entering a lighting instruction (e.g., the first lighting instruction), the aforementioned input portion(s) can be considered to be partitioned into a plurality of sub portions and each sub portion can be operated to generate a sub instruction which constitutes a part of a lighting instruction.

In one example, the first input portion 302 for generating the first lighting instruction can be partitioned into three sub portions 302a/302b/302c. Each of the three sub portions 302a/302b/302c can be operated to generate a sub instruction. Therefore, three sub instructions can be generated to form the first lighting instruction. Hence the first lighting instruction can be considered to be based on a combination of three sub instructions.

In another example, the first input portion 302 for generating the first lighting instruction can be partitioned into three sub portions 302a/302b/302c. Each of the three sub portions 302a/302b/302c can be operated to generate a sub instruction. However, only two (e.g., sub portions 302a/302c) of the three sub portions 302a/302b/302c are operated so that only two sub instructions are generated. Therefore, two sub instructions can be generated to form the first lighting instruction. Hence the first lighting instruction can be considered to be based on a combination of two sub instructions.

In yet another example, the first input portion 302 for generating the first lighting instruction and the second input portion 304 for generating the second lighting instruction can each be partitioned into three sub portions (i.e., sub portions 302a/302b/302c and sub portions 304a/304b/304c respectively). Each sub portion can be operated to generate a sub instruction. Therefore, the first lighting instruction can be considered to be based on a combination of sub instructions generated via sub portions 302a/302b/302c and the second lighting instruction can be considered to be based on a combination of sub instructions generated via sub portions 304a/304b/304c.

Moreover, each input portion 302/304/306 can, for example, take the form of a dialog box and the one or more sub portions of each input portion 302/304/306 can, for example, take the form of corresponding one or more dropdown boxes.

Additionally, although three lighting instructions or less than three lighting instructions have been discussed in the context of FIG. 3, it is further appreciable that more than three lighting instructions can be possible. For example, the option portion 216b can be operated to present a fourth input portion (not shown) for generating a fourth lighting instruction in an analogous manner per earlier discussion concerning the first to third lighting instructions. Furthermore, more than three sub instructions per lighting instruction can also be possible.

The plurality lighting instructions (e.g., the first to fourth lighting instructions) generated form the aforementioned sequence of instructions/instruction sequence. Therefore, the instruction sequence/sequence of instructions include the plurality of lighting instructions (e.g., the first to fourth lighting instructions). In the lighting sequence/sequence of instructions, the first lighting instruction is followed by the second lighting instruction which is in turn followed by the third lighting instruction (i.e., the first lighting precedes the second lighting instruction and the second lighting instruction precedes the third lighting instruction). If a fourth lighting instruction is generated, the fourth lighting instruction is preceded by the third lighting instruction.

Hence, based on the instruction sequence/sequence of instructions (e.g., first lighting instruction followed by the second lighting instruction), the lighting behavior/pattern displayed by the lighting emitting elements 106/212 can have a lighting sequence. That is, the lighting behavior/pattern displayed by the light emitting elements 106/212 can have a lighting sequence which is based on an instruction sequence/sequence of instructions where, for example, the first lighting instruction is followed by the second lighting instruction.

Appreciably, the control portion 216 allows a user to enter/generate an instruction sequence/a sequence of instructions in a rather flexible manner. Specifically, a user can enter any number of lighting instructions as desired by simply operating the option portion 216b. Moreover, each lighting instruction can be based on a combination of sub instructions and the combination of sub instructions can be decided by the user (e.g., as discussed earlier, instead of a combination of three sub instructions, a lighting instruction can be based only on two sub instructions if the user so desires). In this manner, the lighting behavior/pattern of the light emitting elements 106/212 can be customized per user preference in a flexible manner.

Further appreciably, since a GUI 300 presenting all input portions (based on user operation of the option portion(s) 216b) can be displayed via the display screen 216a (analogously, via the display part 104c), the display part/display screen 104c/216a can effectively display the instruction sequence/sequence of instructions for easy/convenient review by the user. For example, a GUI 300 presenting a first input portion 302, a second input portion 304 and a third input portion 306 can be displayed. Hence all three input portions 302/304/306) can be visibly perceived by the user at the same time. Consequently, the instruction sequence/sequence of instructions (i.e., based on all three input portions 302/304/306) can be reviewed by the user in a convenient manner.

The foregoing will now be discussed in the context of an exemplary scenario 400 with reference to FIG. 4 hereinafter.

In an exemplary scenario 400, the electronic device 102/200 can carry a horizontal row of fourteen light emitting elements 106/212 which can be grouped into a plurality of groups. For example, the fourteen light emitting elements 106/212 can be grouped into seven groups (i.e., two light emitting elements per group). In this regard, the control portion 216 can, optionally, be further configured to present a setup portion 402, as shown in FIG. 4a, which allows a user to group the light emitting elements 106/212 by assigning, for example, two light emitting elements 106/212 to each group of the, for example, seven groups as shown in FIG. 4b.

Additionally, a user may wish to see, from the light emitting elements 106/212 a lighting sequence of rainbow color bouncing four times left and right at a frequency of 1 Hertz (Hz) followed by four blue blinks at a frequency of 5 Hz. The user may further wish for such a lighting sequence to be executed ten times (i.e., repeated ten times). In this regard, the lighting behavior/pattern displayed by the light emitting elements 106/212 can be a lighting sequence of rainbow color bouncing four times left and right at a frequency of 1 Hertz (Hz) followed by four blue blinks at a frequency of 5 Hz executed/carried out ten times.

Such a lighting behavior/pattern can be achieved by entering five lighting instructions. In this regard, based on user operation to generate/enter the requisite five lighting instructions, the control portion 216 can be configured to present a first input portion 404, a second input portion 406, a third input portion 408, a fourth input portion 410 and a fifth input portion 412 for generating/entering, respectively, a first lighting instruction to a fifth lighting instruction.

FIG. 4c shows the first input portion 404 in further detail. The first input portion 404 can include a first sub portion 404a (i.e., "Group 1 color setting), a second sub portion 404b (i.e., "Group 2 color setting"), a third sub portion 404c (i.e., "Group 3 color setting"), a fourth sub portion 404d (i.e., "Group 4 color setting), a fifth sub portion 404e (i.e., "Group 5 color setting), a sixth sub portion 404f (i.e., "Group 6 color setting"), a seventh sub portion 404g (i.e., "Group 7 color setting"), an eighth sub portion 404h (i.e., "Transition Type"), a ninth sub portion 404i (i.e., "Duration"), a tenth sub portion 404j (i.e., "Loop Instruction") and an eleventh sub portion 404k (i.e., "Loop Count").

The first sub portion 404a can be used for generating a first sub instruction indicative of the color (e.g., red color) displayed by the light emitting elements 106/212 grouped in a first group (out of the seven groups). Grouping can be based on user grouping using the setup portion 402.

Similarly, each of the second to seventh sub portions 404b/404c/404d/404e/404f/404g can be used for generating a sub instruction (i.e., second to seventh sub instructions respectively) indicative of the color displayed by the light emitting elements 106/212 grouped in the respective second to seventh groups (e.g., orange color for group two, yellow color for group three, green color for group four, blue color for group five, Indigo color for group six and violet color for group seven). The first to seventh group can be positioned in a left to right order in the aforementioned horizontal row. Specifically, the first group can be the left most group in the horizontal row followed by the second group, followed by the third group, followed by the fourth group, followed by the fifth group, followed by the sixth group and, lastly, followed by the seventh group which is the right most group in the horizontal row.

The eighth sub portion 404h can be used for generating an eighth sub instruction indicative of transition visual effect associated with the first to seventh group. For example, the eighth sub instruction can be indicative of a "shift right" visual effect (e.g., red color can be visually perceived to be "shifted" from the first group to the second group and orange color can be visually perceived to be shifted from the second group to the third group, and so on and so forth).

The ninth sub portion 404i can be used for generating a ninth sub instruction indicative of the duration of the transition visual effect. For example, the ninth sub instruction can be indicative of a duration of half a second (i.e., 500 milliseconds).

Meanwhile, the tenth and eleventh sub portions 404j/404k can remain unused.

In this regard, the first lighting instruction, generated/entered by the user using the first input portion 404, can be based on a combination of the first to ninth sub instructions. The first lighting instruction effectively allows a user to visually perceive (from the light emitting elements 106/212) a rainbow shifting from left to right for a duration of 500 milliseconds.

FIG. 4d to FIG. 4g show, respectively, the second to fifth input portions 406/408/410/412 in further detail. Each of the second to fifth input portions 406/408/410/412 can, largely, be similar to the first input portion 404 discussed with reference to FIG. 4a. For example, like the first input portion 404, each of the second to fifth input portions 406/408/410/412 can include a first to eleventh sub portions which can be used/operated in a similar manner as discussed with reference to FIG. 4a. In this regard, relevant portions of earlier discussion concerning the first input portion 404 analogously apply.

Appreciably, the second to fifth input portions 406/408/410/412 are used by the user to enter the second to fifth lighting instructions respectively. Therefore, the second to fifth input portions 406/408/410/412 may differ from the first input portion 404 only in use.

As shown in FIG. 4d, the second lighting instruction generated/entered by the user via the second input portion 406 can, effectively, allow the user to visually perceive (from the light emitting elements 106/212) a rainbow shifting from right to left for a duration of 500 milliseconds. In this regard, the user generates/enters different (as compared to the first input portion 404) sub instructions via relevant sub portions to form the second lighting instruction. Notably, a sub instruction indicative of "shift left" is generated/entered via an eighth sub portion 406h (i.e., "Transition Type"), a sub instruction indicative of "Looping to Instruction 1" is generated/entered via a tenth sub portion 406j (i.e., "Loop Instruction") and a sub instruction indicative of "Loop 4 times" is generated/entered via an eleventh sub portion 406k (i.e., "Loop Count"). Moreover, the different colors (relative to the first input portion 404) can be generated/entered in respect to the first to seventh group via a first to a seventh sub portions 406a/406b/406c/406d/406e/406f/406g (i.e., "Group 1 color setting" to "Group 7 color setting"). Meanwhile, a sub instruction indicative of a duration of 500 milliseconds in relation to "shift left" can be entered/generated via a ninth sub portion 406i (i.e., "Duration").

As shown in FIG. 4e, the third lighting instruction generated/entered by the user via the third input portion 408 can, effectively, allow the user to visually perceive (from the light emitting elements 106/212) blue color (i.e., from all seven groups) for a duration of 100 milliseconds. In this regard, the user generates/enters different (as compared to the first input portion 404 and the second input portion) sub instructions via relevant sub portions to form the third lighting instruction. Notably, sub instructions indicative of blue in color can be generated/entered in respect to the first to seventh group via a first to a seventh sub portions 408a/408b/408c/408d/408e/408f/408g (i.e., "Group 1 color setting" to "Group 7 color setting"), a sub instruction indicative of "solid" (signifying "no transition") is entered/generated via an eighth sub portion 408h (i.e., "Transition Type") and a sub instruction indicative of a duration of 100 milliseconds in relation to "solid" can be entered/generated via a ninth sub portion 408i (i.e., "Duration"). The remaining sub portions (i.e., tenth sub portion 408j "Loop Instruction" and eleventh sub portion 408k "Loop Count") can be unused.

As shown in FIG. 4f, the fourth lighting instruction generated/entered by the user via the fourth input portion 410 can, effectively, allow the user to visually perceive (from the light emitting elements 106/212) black color (i.e., this technically means there is no display of color(s)) for a duration of 100 milliseconds. In this regard, the user generates/enters appropriate sub instructions via relevant sub portions to form the fourth lighting instruction. Notably, sub instructions indicative of black in color can be generated/entered in respect to the first to seventh group via a first to a seventh sub portions 410a/410b/410c/410d/410e/410f/410g (i.e., "Group 1 color setting" to "Group 7 color setting"), a sub instruction indicative of "solid" (signifying "no transition") is entered/generated via an eighth sub portion 410h (i.e., "Transition Type") and a sub instruction indicative of a duration of 100 milliseconds in relation to "solid" can be entered/generated via a ninth sub portion 410i (i.e., "Duration"). Additionally, a sub instruction indicative of "Looping to Instruction 3" is generated/entered via a tenth sub portion 410j (i.e., "Loop Instruction") and a sub instruction indicative of "Loop 4 times" is generated/entered via an eleventh sub portion 410k (i.e., "Loop Count").

As shown in FIG. 4g, the fifth lighting instruction generated/entered by the user via the fifth input portion 412 is effectively an instruction for execution of the first to fourth lighting instructions to be repeated ten times.

In operation, the second lighting instruction is executed/carried out after the first lighting instruction has been executed/carried out. In executing/carrying out the second lighting instruction, it should be noted that the second lighting instruction also requires a loop back to the first lighting instruction for four times. Appreciably, both the first and second lighting instructions are to be executed/carried out, in sequence, for four times. Therefore, the combination of the first and second lighting instructions (i.e., the first lighting instruction followed by the second lighting instruction), executed/carried out four times, allows a user to visually perceive (from the light emitting elements 106/212) a lighting sequence of rainbow color bouncing four times left and right at a frequency of 1 Hz.

Moreover, the third lighting instruction follows the second lighting instruction and is executed/carried out only after the second lighting instruction has been fully executed/carried out (taking into account the loop back sub instruction included in the second lighting instruction) and the fourth lighting instruction is executed/carried out after the third lighting instruction. Considering the combination of the third and fourth lighting instructions, it is appreciable that the user should be able to visually perceive (from the light emitting elements 106/212) four blue blinks at a frequency of 5 Hz (i.e., noting there is a loop back instruction to the third lighting instruction for four times). Both the third and fourth lighting instructions are to be executed/carried out, in sequence, for four times.

The fifth lighting instruction follows the fourth lighting instruction and is executed/carried out only after the fourth lighting instruction has been fully executed/carried out (taking into account the loop back sub instruction included in the fourth lighting instruction). As mentioned earlier, the fifth lighting instruction is effectively an instruction for execution of the first to fourth lighting instructions to be repeated ten times.

Therefore, an instruction sequence/sequence of instructions which includes the first to fifth lighting instructions where the first lighting instruction is carried out/executed, followed by the second lighting instruction, followed by the third lighting instruction, followed by the fourth lighting instruction and followed by, lastly, the fifth lighting instruction, allows a user to visually perceive (from the light emitting elements 106/212) a lighting sequence, repeated ten times, of rainbow color bouncing four times left and right at a frequency of 1 Hertz (Hz) followed by four blue blinks at a frequency of 5 Hz.

Hence, it is appreciable that according to the present disclosure, there is flexibility in the addition of any number of input portions for generating corresponding any number of lighting instructions. Moreover, each input portion can include one or more sub portions for generating/entering sub instructions. Furthermore, a setup portion can be provided/presented for flexibility in grouping the light emitting elements 106/212 per user preference. Therefore, it is further appreciable that lighting behavior/pattern of the light emitting elements 106/212 can be highly customized in accordance with user preference in a highly flexible manner.

FIG. 5 shows a flow diagram of a method 500 in relation to the earlier discussed system 100 and electronic device 200 per FIG. 1 to FIG. 4.

Specifically, FIG. 5 shows a flow diagram of a method 500 for controlling lighting behavior of a plurality of light emitting elements 106/212 based on an instruction sequence having a plurality of lighting instructions. The plurality of light instructions can be entered/generated by a user via corresponding plurality of input portions displayed/presented by the control portion 216 as earlier discussed with reference to FIG. 1 to FIG. 4.

The method 500 can include an initial lighting instruction generating step 502 and an option activation step 504.

In regard to the initial lighting instruction generating step 502, an initial input portion (e.g., the first input portion 302) can be presented for use by a user to generate an initial lighting instruction (i.e., a first lighting instruction). Specifically, a first input portion 302 can be provided for generating a first lighting instruction of the plurality of lighting instructions.

In regard to the option activation step 504, one or more option portion(s) 216b can be provided for use by a user to instruct the control portion 216 to present corresponding one or more subsequent input portion(s) (i.e., subsequent to the first input portion 302) for generating/entering corresponding one or more subsequent lighting instruction(s) (i.e., subsequent to the first lighting instruction).

In one example, one option portion 216b can be provided for use by a user to instruct the sequential presentation of a second input portion 304 and a third input portion 306 (i.e., presentation of the second input portion 304 follows the first input portion 302 and presentation of the third input portion 306 follows the second input portion 304). The second and the third input portions 304/306 can be used by a user to generate/enter, respectively, a second lighting instruction and a third lighting instruction of the plurality of lighting instructions.

In another example, a plurality of option portions 216b can be provided. Specifically, a first option portion 308 can be provided for use by a user to instruct the presentation of a second input portion 304 and a second option portion 310 can be provided for use by a user to instruct the presentation of a third input portion 306. The second and the third input portions 304/306 can be used by a user to generate/enter, respectively, a second lighting instruction and a third lighting instruction of the plurality of lighting instructions.

Therefore, the lighting behavior displayed by the light emitting elements 106/212 can have a lighting sequence which is based on an instruction sequence where the initial lighting instruction is followed by the subsequently generated lighting instructions. Specifically, the instruction sequence is such that the initial lighting instruction (i.e., which is first generated) is followed by the next most immediate subsequently generated lighting instruction (i.e., which is generated second to the initial lighting instruction) followed by the next subsequently generated lighting instruction (i.e., which is generated after the second to the initial lighting instruction). That is, the instruction sequence is, in general, such that the initial lighting instruction is followed by subsequently generated lighting instructions in the order which the subsequent lighting instructions have been generated. For example, the lighting behavior/pattern displayed by the light emitting elements 106/212 can have a lighting sequence which is based on the instruction sequence where the first lighting instruction is followed by the second lighting instruction which is followed by the third lighting instruction.

Earlier mentioned, operationally, a user can use the input part 104a to generate input signals which can be communicated to the processing part 104b for processing to generate control signals and output signals. The input signals can, for example, include lighting instructions generated/entered by the user.

Appreciably, the input signals can, for example, further include instructions for the processing part 104b to generate output signals such that the control portion presents/displays one or more subsequent input portion(s) based on activation (e.g., by manner of user touching the display screen 216a where the option portion 216b is displayed as discussed earlier) of the aforementioned one or more option portions 216b.

The input signals can, for example, yet further include instructions for the processing part 104b to generate output signals such that the control portion presents/displays a plurality of option portions 216b based on user operation.

Earlier mentioned, in an exemplary application, a user can choreograph lighting behavior/pattern based on audio output. Specifically, the electronic device 200 can be used by a user for choreographing lighting behavior/pattern in accordance with audio output. This will be discussed in further detail with reference to FIG. 6 hereinafter.

Figure 6:
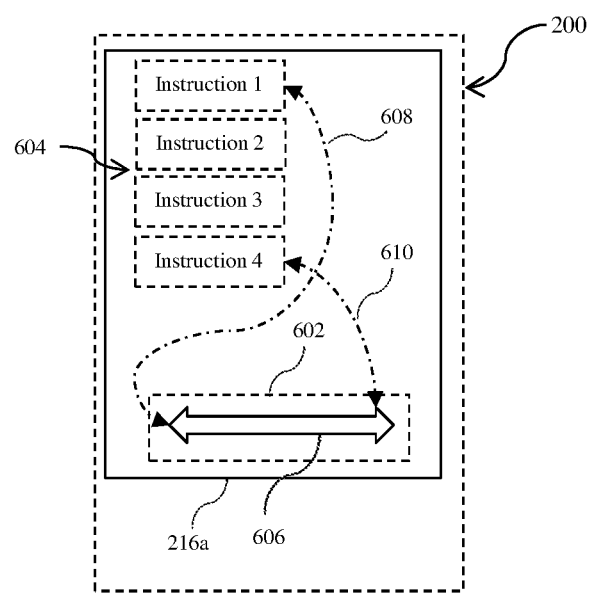
FIG. 6 shows an exemplary application of the system of FIG. 1 and electronic device of FIG. 2 where a user can choreograph lighting behavior/pattern based on audio output, according to an embodiment of the disclosure.

Specifically, FIG. 6 shows an exemplary application of the electronic device 200 (and, analogously, the system 100) where a user can choreograph lighting behavior/pattern based on audio output, according to an embodiment of the disclosure.

As shown in FIG. 6, the display screen 216a can be configured to present a choreography portion 602 in accordance with an embodiment of the disclosure. The choreography portion 602 can, for example, be presented after the lighting instructions have been generated. Additionally, audio output from the speaker drivers can be based on audio files (e.g., mp3 based audio files) being run/executed by, for example, the apparatus 214.

Moreover, the display screen 216a can be configured to display graphical representations (e.g., in the form of tabs 604) of the generated lighting instruction(s). For example, the generated plurality lighting instructions (e.g., the first to fourth lighting instructions) can be graphically presented as interactive tabs 604 (e.g., "instruction 1," "instruction 2," "instruction 3" and "instruction 4") movable (e.g., by manner of "drag and drop") by a user within the display screen 216a.

The choreography portion 602 can be configured to display a representation of an audio file. For example, a graphic representation (e.g., in the form of a timeline bar 606) of the duration of the audio output based on the audio file (e.g., duration of a song) and a user can be allowed to insert (e.g., via "drag and drop") generated lighting instructions at particular points in time for the duration of the audio output. Therefore, the choreography portion 602 can be configured to be usable by a user to associate one or more lighting instructions to corresponding one or more portions of the audio file. Appreciably, it is also possible for a plurality of lighting instructions to be associated with one portion of the audio file (i.e., as opposed to only one lighting instruction being associated with one portion of the audio file).

In one specific example, a user can drag and drop "instruction 1" at the start of a song (i.e., at the beginning of the timeline bar 606, as depicted by dotted double arrow 608) which has a duration of 6 minutes. The user can subsequently drag and drop "instruction 2" one minute into the song, followed by "instruction 3" four minutes into the song and ending with "instruction 4" (e.g., as depicted by dotted double arrow 610) thirty seconds towards the end of the song. In another variation, if it is desired for the start of the song to be associated with a plurality of visual effects, it is also possible for a user to drag and drop, for example, "instruction 1" and "instruction 3" at the start of the song.

In the above manner, a user can control what/which lighting effect (i.e., a lighting instruction) can be visually perceived at which particular point in time of the audio output. Therefore, the user can choreograph lighting behavior/pattern based on audio output.

Preferably, the audio file subjected to the user's choreography can be saved and replayed whenever desired (i.e., on the electronic device 200 or on another device). By using the choreography portion 602 to insert generated lighting instructions per earlier discussion, lighting instruction(s) can be considered to be embedded in the audio file. An audio file having lighting instruction(s) embedded therein can be referred to as a "modified audio file". In one example, lighting instruction(s) can be embedded in ID3 tag(s) of audio file(s). In another example, lighting instruction(s) can be embedded in audio signals which frequencies are above human audible range (e.g., via transformation from frequency to time domain using digital signal processing based techniques). In this regard, it is appreciable that the processing part 104b of the electronic device 200 (and analogously corresponding processing parts of the aforementioned another device) can be configured to embed the lighting instruction(s), save the modified audio file and decode the modified audio file for replay.

In one embodiment, the modified audio file can be saved for replay on the electronic device 200. In another embodiment, the modified audio file can be saved and communicated to one or more another device (i.e., other than the electronic device 200) for replay on that/those other device(s). In yet another embodiment, the modified audio file can be saved and communicated to one or more another device, and the modified audio file can be replayed on the electronic device 200 and/or the one or more another device.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

In one example, in regard to the exemplary application concerning choreography of lighting behavior/pattern based on audio output, it is appreciable that there is no strict requirement for sequencing per se (i.e., where the initial lighting instruction is followed by the subsequently generated lighting instructions). For example, a user may choose to drag and drop "instruction 3" at the start of the song and "instruction 1" four minutes into the song (instead of "instruction 1" at the start of the song and "instruction 3" four minutes into the song as discussed in an example earlier). Therefore, lighting instructions in the sequence of instructions, for the purpose of choreography, can be applied (e.g., inserted) flexibly by a user (e.g., in-sequence, out-of-sequence or certain lighting instructions skipped entirely).

In another example, in regard to the exemplary application concerning choreography of lighting behavior/pattern based on audio output, although manual based choreography is discussed (i.e., a user is required to perform the function of "drag and drop"), it is appreciable that automatic choreography is also possible. For example, the processing part of the electronic device 200 can be configured to detect audio parameters such as rhythm or tempo (i.e., beats per minute) etc. associated with an audio file (i.e., music tempo of a song). Lighting instruction(s) can then be automatically assigned, and thus associated with, detected audio parameters by the processing part. In one embodiment, the processing part can be further configured to embed lighting instruction(s) to an audio file based on such detected audio parameters. For example, during a fast tempo portion of the audio output, a user can visually perceive lighting output from the LEDs to be "blinking" in pace with the fast tempo portion of the audio output.

In yet another example, although the electronic device 200 is mainly discussed in the context of an audio output based device such as a speaker or a soundbar, it is appreciable that other types of devices are also possible. For example, the electronic device 200 can be a computer peripheral device such as a pointing device (e.g., a mouse) carrying LED(s)) or a keyboard carrying LED(s). Of course, if the electronic device 200 is, for example, a non-audio output based device (e.g., a mouse), it is appreciable that a separate audio output based device (e.g., a speaker) is required for audible perception of the aforementioned audio output.

In yet a further example, in regard to the exemplary application concerning choreography of lighting behavior/pattern based on audio output, although embedding of lighting instructions to generate/produce a modified audio file is discussed using the example of graphics user interface based insertion (i.e., dragging and dropping of tabs 604), it is appreciable that other ways are also possible. One other possible way can be by manner of programming using a software development kit (SDK). Another possible way can be by manner of programming via disk operating system (DOS) based programming environment.

The invention claimed is:

1. An apparatus configured to control a plurality of light emitting elements so that the light emitting elements display a lighting behavior based on audio output which is based on an audio file, the apparatus comprising:
- a control portion operable to generate an instruction sequence usable for controlling the lighting behavior of the light emitting elements, the instruction sequence comprising a plurality of lighting instructions, wherein at least one of the plurality of lighting instructions is based on a combination of sub instructions, and
- a choreography portion operable to associate at least one lighting instruction from the plurality of lighting instructions with at least one portion of the audio file.

2. The apparatus of claim 1 wherein the choreography portion is usable for embedding at least one lighting instruction from the plurality of lighting instructions in the audio file to generate a modified audio file.

3. The apparatus of claim 2 wherein the modified audio file is saved for subsequent replay by at least one of the apparatus and another device.

4. The apparatus of claim 1, wherein the combination of sub instructions is the result of combining a subset of sub instructions together.

5. The apparatus of claim 1, wherein each of the sub instructions is selected from the group consisting of color setting, transition type, duration, loop instruction, and loop count.

* * * * *